Oct. 2, 1951     R. C. LARSON ET AL     2,569,678

SUSPENSION ROD FOR THE INTERIOR OF VEHICLES

Filed April 19, 1947

INVENTORS
RAY A. PATTERSON
& ROY C. LARSON

BY
*Wm. H. Dean*

AGENT

Patented Oct. 2, 1951

2,569,678

UNITED STATES PATENT OFFICE 2,569,678

SUSPENSION ROD FOR THE INTERIOR OF VEHICLES

Roy C. Larson, Buffalo, S. Dak., and Ray A. Patterson, San Diego, Calif., assignors, by direct and mesne assignments, of one-half to said Roy C. Larson and one-half to Harold Larson Application April 19, 1947, Serial No. 742,620

2 Claims. (Cl. 224—42.1)

Our invention relates to a suspension rod for the interior of vehicles and the objects of our invention are:

First, to provide a suspension rod of this class which is very simple and easy to install in various motor vehicles of various dimensions;

Second, to provide a suspension rod of this class which does not in any way harm or mar the interior of motor vehicles to which it is attached;

Third, to provide a suspension rod of this class which is very quickly and easily removed if desired;

Fourth, to provide a suspension rod of this class which is very light, neat and compact;

Fifth, to provide a suspension rod of this class which is very strong in proportion to its size;

Sixth, to provide a suspension rod of this class which may be used to support a variety of clothes, hats or other apparel;

Seventh, to provide a suspension rod of this class which may be arranged to support and stabilize infants' cribs in an automobile if desired;

Eighth, to provide a suspension rod of this class which generally improves the interior appointments of a motor vehicle by providing convenient means for supporting garments and other articles out of the way of the occupants of the automobile whereby comfort of said occupants may be greatly increased when traveling;

Ninth, to provide a suspension rod and bag arrangement which properly supports and efficiently protects clothing in a motor vehicle from becoming soiled or wrinkled; and Tenth, to provide a suspension rod of this class which is very simple and economical of construction, efficient, durable and which will not readily deteriorate or get out of order.

Figure 1:
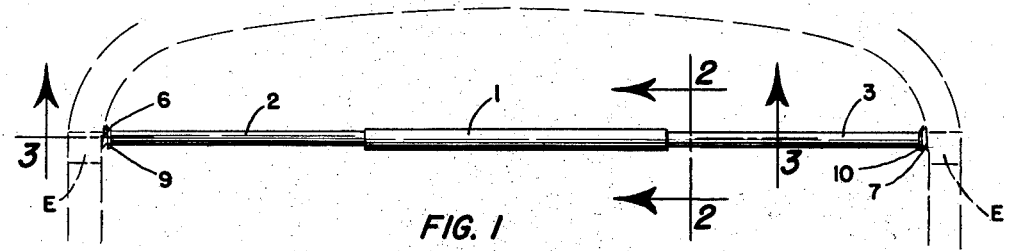
Figure 2:
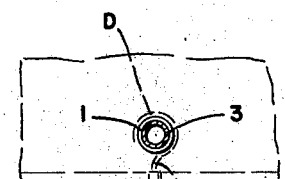
Figure 4:
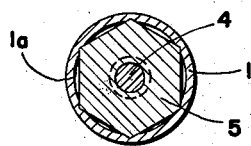
Figure 5:
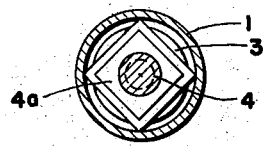
Figure 3:
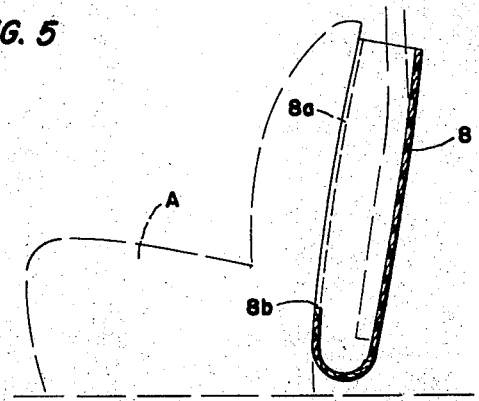
Figure 3:
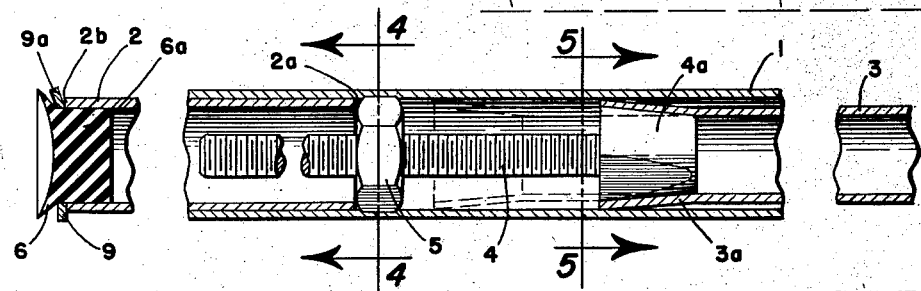

With these and other objects in view, as will appear hereinafter, our invention consists of certain novel features of construction, combination and arrangement of parts and portions as will be hereinafter described in detail and particularly set forth in the appended claims, reference being had to the accompanying drawing and to the characters of reference thereon forming a part of this application in which:

Fig. 1 is a side elevational view of our suspension rod for the interior of vehicles showing by dash lines the relative position of said suspension rod with the interior of a motor vehicle; Fig. 2 is a cross sectional view of our suspension rod for the interior of vehicles taken from the line 2—2 of Fig. 1 showing the front seat of an automobile by dash lines and also the roof thereof and further illustrating a bag in connection with the back of the automobile front seat for supporting the lower ends of clothes suspended from said rod; Fig. 3 is an enlarged fragmentary sectional view taken from the line 3—3 of Fig. 1; Fig. 4 is a transverse sectional view taken from the line 4—4 of Fig. 3 and Fig. 5 is a transverse sectional view taken from the line 5—5 of Fig. 3.

Similar characters of reference refer to similar parts and portions throughout the several views of the drawing.

The telescopic members 1, 2 and 3, bolt 4, nut 5, pads 6 and 7, bag 8 and the washers 9 and 10 constitute the principal parts and portions of our suspension rod for the interior of vehicles.

The telescopic member 1 is a hollow tubular member and the hexagonal nut 5 is pressed therein, as shown in Fig. 4 of the drawing, wherein the corners of the hexagonal nut are embedded in the internal wall 1a of said telescopic member 1. The inner end 2a of the telescopic member 2 is abutted with the nut 5 and this telescopic member 2 is preferably a hollow tubular member, as shown in Fig. 3 of the drawing, and fitted in the opposite end 2b thereof is the shank portion 6a of the vacuum cup 6 which is preferably a resilient member made of rubber or other suitable material. Adjacent the end 2b of the telescopic member 2 is the washer 9 of greater diameter than the end of the telescopic member 2d arranged to support the vacuum cup 6. The bolt 4, as shown in Fig. 3 of the drawing, is screw threaded in the nut 5 and is provided with a tapered rectangular in cross section head portion 4a fitted in a formed tapered portion 3a at the inner end of the telescopic member 3 which is a hollow tubular member, longitudinally reciprocally mounted in the telescopic member 1, all as shown best in Fig. 3 of the drawing. The pad 7, as shown in Fig. 1 of the drawing at the opposite end of the telescopic member 3, is similar in construction to the pad 6 hereinbefore described in connection with the telescopic member 2 and the washer 10 is similar to the washer 9 as hereinbefore described. The bag 8, as shown in Fig. 2 of the drawing, is stitched at its edge portions 8a to a seat cover in connection with the front car seat A and is looped downwardly and upwardly to its lower edge 8b in connection with said seat A, providing a receptacle in which the clothes B may hang at the rear of the front seat and in which said clothes may be protected and also prevented from bothering occupants of the rear seat of the vehicle. The clothes B may be hung on a conventional clothes hanger C having a hook D positioned over one of the telescopic members 1, 2 or 3 of our suspension rod for the interior of vehicles.

The operation of our suspension rod for the interior of vehicles is substantially as follows:

In order to install our suspension rod, the over-all length of the telescopic members 1, 2 and 3 in assembly, is so adjusted that said suspension rod may be fitted transversely between opposite sides of the vehicle body above the edges of the doors, as indicated at E in Fig. 1 of the drawing. In order to securely position said suspension rod in position, as shown in Fig. 1 of the drawing, the telescopic member 1 is rotated carrying with it the nut 5 which is screw threaded on the bolt 4. Rotation of the nut 5 causes extension of the bolt 4 toward one end of the telescopic member 1 away from the inner end 2a of the telescopic member 2 so that the telescopic member 3, in connection with the head 4a of the bolt 4, is extended toward the opposite side of the automobile body from the telescopic member 2. Thus the length of the suspension rod is extended whereby rigid engagement of the pads 6 and 7 is maintained with the interior opposed portions of the vehicle body. It will be here noted that the inner end 2a of the telescopic member 2 abuts the nut 5 and remains substantially stationary while the head 4a of the bolt 4 forces the telescopic member 3 outwardly of the telescopic member 1. The tapered square in cross section head portion 4a of the bolt 4 maintains firm and positive engagement with the end 3a of the telescopic member 3 so that relatively great pressure may be exerted intermediate opposite sides of the automobile body for maintaining our suspension rod in rigid connected relation with said automobile body. The washers 9 and 10 prevent shearing of the vacuum cup portions of the pads 6 and 7 at the ends of the telescopic members 2 and 3, respectively. The pads 6 and 7 at opposite ends of the telescopic members 2 and 3 provide means for engagement with the interior of the vehicle body and prevent damage thereto while maintaining a secure frictional engagement therewith.

It will be here noted that the use of our suspension rod for the interior of vehicles may include the supporting of clothes, hats and various other articles which may be conveniently suspended therefrom or supported thereby. The support and stabilization of infants' cribs may be readily provided for greatly increasing the utility of the interior appointments of a motor vehicle.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a suspension rod of the class described, the combination of a hollow tubular telescopic member substantially at the middle of said suspension rod, second and third telescopic members extending from opposite ends of said first-mentioned telescopic member, a bolt having a tapered rectangular in cross section head portion fitted in the inner end of one of said telescopic members, said bolt having a screw threaded portion, a nut thereon engaging the other of said telescopic members internally of said first-mentioned telescopic members and engaging the same whereby rotation of said first-mentioned telescopic member rotates said nut longitudinally extending said bolt therefrom whereby said second and third-mentioned telescopic members are longitudinally extended relatively to each other.

2. In a suspension rod of the class described, the combination of a hollow tubular telescopic member substantially at the middle of said suspension rod, second and third telescopic members extending from opposite ends of said first-mentioned telescopic member, a bolt having a tapered rectangular in cross section head portion fitted in the inner end of one of said telescopic members, said bolt having a screw threaded portion, a nut thereon engaging the other of said telescopic members internally of said first-mentioned telescopic member and engaging the same whereby rotation of said first-mentioned telescopic member rotates said nut longitudinally extending said bolt therefrom whereby said second and third-mentioned telescopic members are longitudinally extended relatively to each other, and pads at the extended ends of said second and third telescopic members.

ROY C. LARSON.
RAY A. PATTERSON.

REFERENCES CITED

The following references are of record in the file of this patent:

UNITED STATES PATENTS

| Number | Name | Date |
| --- | --- | --- |
| 1,473,161 | Rogers | Nov. 6, 1923 |
| 1,527,056 | Martin | Feb. 17, 1925 |
| 1,722,122 | Wilson | July 23, 1929 |
| 1,726,257 | Carlisle | Aug. 27, 1929 |
| 1,951,660 | Klaudt | Mar. 20, 1934 |
| 2,293,168 | Pirone | Aug. 18, 1942 |
| 2,447,908 | Hoots | Aug. 24, 1948 |
| 2,532,909 | Hart | Dec. 5, 1950 |